(12) United States Patent
Hellat et al.

(10) Patent No.: US 7,069,727 B2
(45) Date of Patent: Jul. 4, 2006

(54) METHOD FOR OPERATING A GAS TURBO GROUP

(75) Inventors: Jaan Hellat, Baden-Ruetihof (CH); Stefan Tschirren, Nunningen (CH); Rolf Dittmann, Nussbaumen (CH)

(73) Assignee: Alstom Technology Ltd., Baden (CH)

( * ) Notice: Subject to any disclaimer, the term of this patent is extended or adjusted under 35 U.S.C. 154(b) by 67 days.

(21) Appl. No.: 10/775,141

(22) Filed: Feb. 11, 2004

(65) Prior Publication Data

US 2004/0216462 A1 Nov. 4, 2004

(30) Foreign Application Priority Data

Feb. 11, 2003 (CH) .................................. 0199/03

(51) Int. Cl.
*F02C 9/00* (2006.01)
*F23R 3/40* (2006.01)

(52) U.S. Cl. .................... 60/777; 60/39.27; 60/723

(58) Field of Classification Search .............. 60/39.23, 60/39.27, 723, 777, 794
See application file for complete search history.

(56) References Cited

U.S. PATENT DOCUMENTS

| | | | |
|---|---|---|---|
| 3,975,900 A * | 8/1976 | Pfefferle | .................... 60/39.23 |
| 4,926,645 A | 5/1990 | Iwai et al. | |
| 5,003,768 A * | 4/1991 | Kappler et al. | ............. 60/39.23 |
| 5,395,235 A | 3/1995 | Lan-Sun Hung | |
| 5,826,429 A | 10/1998 | Beebe et al. | |
| 6,095,793 A | 8/2000 | Greeb | |
| 2002/0056276 A1 | 5/2002 | Dalla Betta et al. | |

FOREIGN PATENT DOCUMENTS

| | | |
|---|---|---|
| EP | 0 062 149 A1 | 10/1982 |
| EP | 0 321 809 B1 | 5/1991 |
| EP | 0 669 500 A1 | 8/1995 |
| EP | 0 694 740 A2 | 1/1996 |
| EP | 0 767 345 A2 | 4/1997 |

OTHER PUBLICATIONS

Search Report for CH 2003 1992/03 (May 13, 2003).

* cited by examiner

*Primary Examiner*—Louis J. Casaregola
(74) *Attorney, Agent, or Firm*—Cermak & Kenealy, LLP; Adam J. Cermak

(57) ABSTRACT

A gas turbo group has a combustion chamber comprising a catalytic burner stage (2), a preburner stage (1) located upstream from the catalytic burner stage, as well as a non-catalytic burner stage (11, 5, 6) located downstream from the catalytic burner stage. The preburner stage serves to always maintain a temperature ($T_1$) at the inlet into the catalytic stage that corresponds at least to a minimum temperature ($T_{MIN}$) necessary for operating the catalytic burner stage. According to the invention, the gas turbo group is operated so that the burner stage located downstream from the catalytic combustion chamber is taken into operation only when the temperature ($T_2$) at the outlet from the catalytic stage has reached an upper limit in the presence of a maximum combustion air mass flow.

14 Claims, 3 Drawing Sheets

METHOD FOR OPERATING A GAS TURBO GROUP

This application claims priority under 35 U.S.C. § 119 to Swiss patent application number 2003 0199/03, filed 11 Feb. 2003, by Jaan Hellat et al., the entirety of which is incorporated by reference herein.

1. Technical Field of Application

The present invention relates to a method for operating a gas turbo group.

2. State of the Art

The catalytic conversion of fuels presents an opportunity for generating heat with few noxious substances. However, a disadvantage in using gas turbo groups is the limitation of achievable temperatures, which is necessary in particular because of life span considerations. The turbine inlet temperatures that are desirable today in the interest of good efficiencies and high unit performance cannot be achieved with catalytic combustion chambers alone: While the combustion chambers of modern gas turbines generate hot gas temperatures of, for example, about 1450° C., a catalytic combustion chamber can only be operated up to temperatures of approximately 1000° C.

EP 694 740 describes the arrangement of a self-igniting combustion chamber, of the type also known from EP 669 500, downstream from a catalytic stage. The maximum outlet temperature of the catalyzer of approximately 1000° C.—EP 694 740 specifies 800° C. to 1100° C.—is optimally suitable for the minimum temperature required for the stable and safe function of a self-igniting combustion chamber, which, depending on the specific fuel, is, for example 900–950° C. Because of the relatively low thermal load—the temperature differential to be overcome is generally less than 600° C.—of the operation with good premixing of fuel and combustion gas, as well as a very low-fuel combustion, which again is associated with very few problems because of the high inlet temperature, such self-igniting combustion chambers have a very low nitrogen oxide emission and good burn-out. EP 694 740 specifies to use a vortex generator of a premix burner known from EP 321 809 to prepare the fuel-air mixture for the catalyzer, but emphasizes that no flame stabilization may take place there.

EP 767 345 discloses a gas turbo group with a multi-stage burner system consisting of a catalytic first burner stage, a non-catalytic second burner stage, as well as an interposed start-up burner. A separate preparation of the fuel-air mixture is provided for the catalytic burner stage in order to enable an optimization of this mixture. The mixture supplied to the catalytic burner stage is preheated by a thermal reactor with a heat source that is not further specified. The catalytic burner stage works at outlet temperatures of approximately 950° C., so that self-igniting burners, as known from EP 694 740 or EP 669 500, can be used in the second burner stage. The burner system proposed in this publication is supposed to prevent that the catalytic burner stage is supplied with hot gases or waste gases from a preceding combustion. When starting up a gas turbo group, it is first driven up to approximately 20% of its relative power with the start-up burner, before the catalytic burner stage is taken into operation. Then the second burner stage, which works downstream from the start-up burner, is added. The preparation of the fuel-air mixture for the catalytic burner stage used in this publication is, however, very complicated and expensive. In addition, under a full load, the preparation stage should be shut down, which means that it is not possible to react adequately to rapid load changes. The start-up burner also only operates up to approximately 20% of the relative power of the gas turbo group. Since a spontaneous and quick switching in of the start-up burner is required, the power reduction from a high load to below 20% of relative power is also critical here. Especially in the presence of highly transient operating states, such as a load rejection, where the power is abruptly reduced to or near zero by opening the generator or power switch of a stationary gas turbo group used for power generation, or during protective load shedding, where the power is reduced with a very high gradient of, for example, approximately 50% per minute, a timely interception of the thermal power can no longer be reliably ensured with a preburner that will be operated when a standstill occurs. Intermittent operation of the catalytic stage also causes undesired and even damaging thermal shocks to the frequently ceramic carrier material of the catalyzer.

The lowest emission values are achieved if the smallest possible portion of the thermal power conversion is accomplished by non-catalytic combustion.

DESCRIPTION OF THE INVENTION

It is the objective of the invention to disclose a method of the aforementioned type that avoids the disadvantages of the state of the art. In particular, the objective is to specify an operating concept for a gas turbo group with a combustion chamber having a catalytic stage in such a way that the favorable emission behavior of the catalytic stage will be effective over the largest possible power range.

This objective is realized with the method according to Claim 1. Advantageous designs of the method are the subject matter of the secondary claims or can be found in the following specification and exemplary embodiments.

The core of the invention therefore consists of varying the combustion air mass flow in a gas turbo group having a catalytic stage and a following, non-catalytic stage in such a way that, with a variable fuel mass flow, the temperature at the outlet of the catalytic stage remains as constant as possible, and only then feeding additional fuel to the burner stages and/or combustion chambers located downstream from the catalytic stage when the combustion air mass flow is at a maximum.

In one embodiment of the invention, the combustion air mass flow is changed by adjusting an adjustable compressor guide row, in particular an adjustable pre-guide row of the compressor. It is known, for example, to adjust an adjustable pre-guide row of a compressor between a maximum closed position with a smallest mass flow and a completely open position with a maximum mass flow, whereby the compressor mass flow correlates very well with the combustion air mass flow.

According to another embodiment of the invention, the combustion air mass flow is increased by cooling the suction air upstream from the compressor, and conversely is reduced by reducing the cooling power applied for cooling.

Naturally, both methods can be combined and, preferably, cascaded. In a preferred embodiment, given a rising fuel mass flow, first the pre-guide row is opened in order to limit the temperature at the compressor outlet. Once this pre-guide row has been completely opened, the cooling power for the suction air, in the presence of a rising fuel mass flow, is increased upstream from the compressor in such a way that the temperature remains constant at the outlet from the catalytic stage, even though the fuel mass flow rises towards the catalytic stage.

In a preferred embodiment of the invention, the pre-guide row is kept in the maximum closed position as long as the temperature at the catalyzer outlet has not reached the set value or upper limit; to increase the power, only the total fuel mass flow is increased then, and no fuel is supplied to the combustion chambers or burner stages located downstream from the catalytic burner stage.

Completely analogously, all other measures for increasing the combustion air mass flow, especially for cooling the combustion air mass flow, are preferably deactivated until a set temperature value, which advantageously corresponds in essence to the maximum permanently permissible temperature of the catalyst material, is reached at the outlet of the catalytic combustion stage.

If this set temperature value is reached in the presence of a rising fuel mass flow, the measures for increasing the combustion air mass flow are activated. Naturally, the temperature at the outlet from the catalytic stage decreases with a constant fuel mass flow and elevated combustion air mass flow. As described, the increase of the combustion air mass flow is preferably brought about by adjusting an adjustable guide row of the compressor accordingly, in particular by opening an adjustable pre-guide row and/or by increasing the mass flow-specific cooling power for measures for cooling the suction air. Conversely, the temperature at the outlet from the catalytic stage rises when the combustion air mass flow decreases. As described, the reduction of the combustion air mass flow is preferably brought about by adjusting an adjustable guide row of the compressor accordingly, in particular by partially closing an adjustable pre-guide row and/or by decreasing the mass flow-specific cooling power for measures for cooling the suction air. In this way, the temperature at the catalyzer outlet can be regulated to the desired value. Once the combustion air mass flow has been maximized, yet another increase in the total fuel mass flow is necessary in order to achieve a set effective power of the gas turbo group, the fuel mass flow metered to the catalytic stage is adjusted so that the temperature at the catalyzer outlet remains at the desired value, and a second partial fuel mass flow is supplied to burners or burner stages, for example, a following non-catalytic stage, located downstream from the catalytic stage, and is converted there. According to the invention, the total fuel mass flow is distributed so that always the greatest possible portion is converted in the catalytic stage, in general by always keeping the temperature at the catalyzer outlet essentially at the upper permanently permissible limit. The invention is based on the concept, if it is no longer possible to do so otherwise when power is increased, of supplying fuel to a non-catalytic stage located downstream from the catalytic stage.

The gas turbo group according to the invention furthermore ensures operation with especially few noxious substances in particular when a non-catalytic stage following the catalytic stage works according to the principle of a self-igniting combustion chamber, since then a very lean premixed fuel-air mixture can be converted. Such a combustion chamber is known from EP 674 740. The catalytic burner stage as well as the quantity of fuel supplied to this burner stage are designed, for example, for an outlet temperature of approximately 900° C. to 950° C. or higher, whereby the permanently permissible temperature that ultimately represents the limiting factor naturally must be complied with.

The operation according to the invention of a gas turbo group with a combustion chamber known, for example, from EP 674 740, enables a low-emissions partial load operation, since the highest possible power range of the gas turbo group is provided by the catalytic burner stage. There may be a disadvantageous tendency with this type of operation that the waste gas temperature of the gas turbo group is very low over a wide power range in the partial load range. In combination operation, with a following waste heat steam generator whose steam is supplied to a steam turbo group, live steam data that permit a problem-free, unrestricted operation of the water-steam cycle, are therefore only generated at a high load. To use waste heat, the use of a closed gas turbine in the low temperature cycle, as proposed in WO 03/076781, is therefore possible for the operation according to the invention of the gas turbo group. The relevant disclosed content of WO 03/076781 thus represents an integral part of this publication.

During a load rejection, a preferred and advantageous embodiment of the method according to the invention provides that at first the second, non-catalytic burner stage is directly shut off, so that the compressor outlet temperature falls to idle level. The compressor pre-guide row remains standing open for several seconds. At the same time, or immediately after the second burner stage is shut off, the fuel mass flow supplied to the preburner is greatly increased, and the preburner stage is preferably operated with a predetermined, high fuel mass flow, in order to prevent the extinction of the catalyst of the catalytic burner stage; after this, the fuel quantity of the preburner stage can be adjusted to the fuel quantity necessary in idle operation of the gas turbo group. The fuel quantity supplied to the catalytic burner stage is hereby regulated in such a way that the rotor speed of the gas turbine is restricted to the nominal speed. During a subsequent load increase, the second burner stage is then again taken into operation again in order to regulate the load.

BRIEF DESCRIPTION OF DRAWINGS

The invention is explained in more detail below in reference to exemplary embodiments illustrated in the drawing. In the drawing.

WAYS OF EXECUTING THE INVENTION

Figure 1:
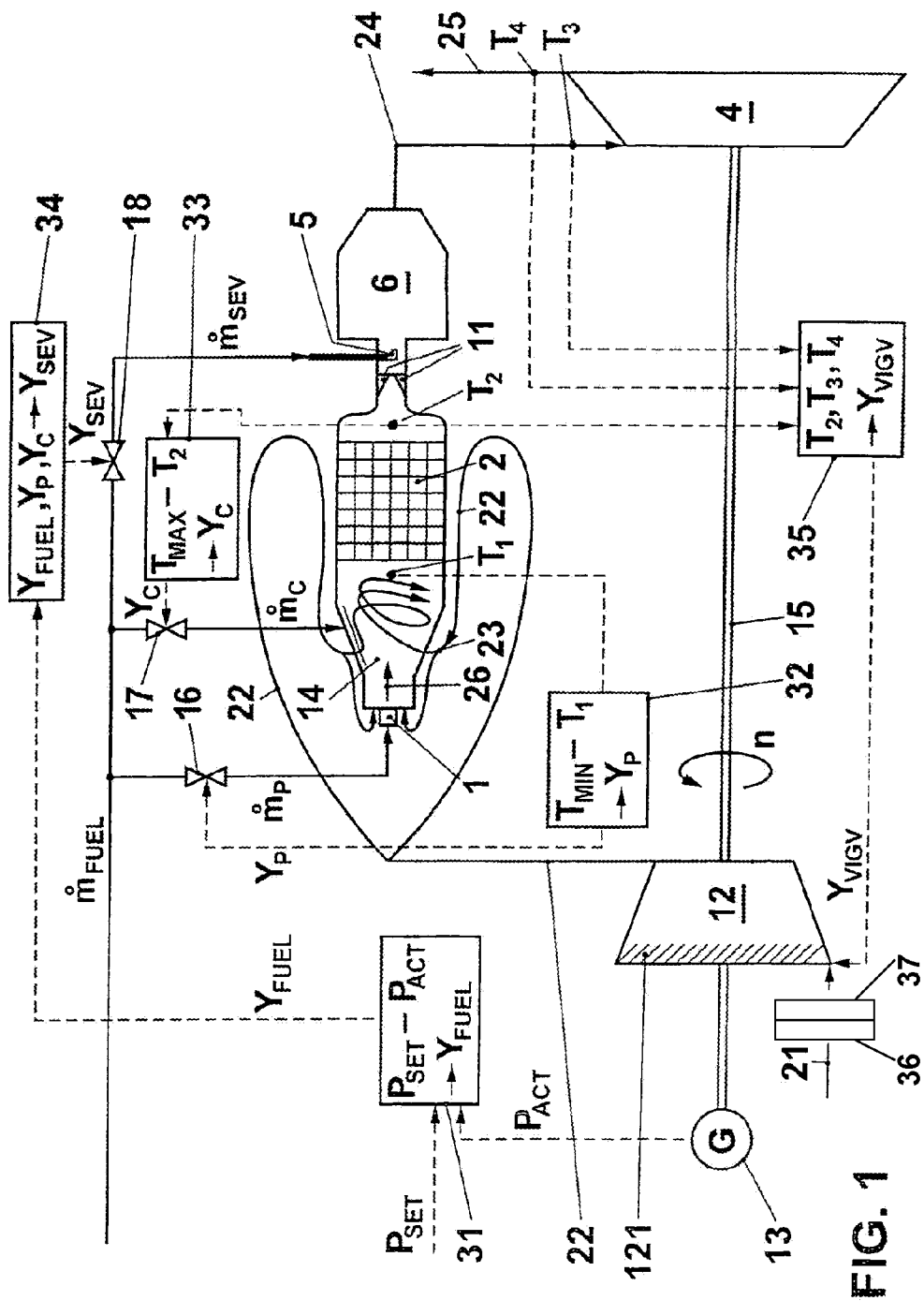
FIG. 1 shows an example of a gas turbo group that can be operated according to the invention.

FIG. 1 shows a gas turbo group suitable for executing the method according to the invention. A turbine 4 and a compressor 12 are arranged on a common shaft 15. A generator 13 is also arranged on the same shafting. The compressor 12 takes in air 21 from the environment and condenses it. The compressor 12 furthermore has an adjustable pre-guide row 121. Its position essentially determines the suction volume stream and therefore, with a given environmental temperature and given environmental pressure, the air mass flow of the gas turbo group. Condensed air 22 is supplied to a combustion chamber that will be described in further detail below. As can be seen, the condensed air is passed prior to its introduction into the combustion chamber in a counter-flow to the hot gas inside the combustion chamber along the latter's outside walls. The combustion chamber structure is hereby convectively cooled, and the air subsequently fed to the combustion is preheated. As explained below, at least one fuel mass flow is combusted in the condensed air in the combustion chamber. Hot, compressed flue gas 24 flows out of the combustion chamber and enters the turbine 4 with a turbine inlet temperature $T_3$, and in which turbine the flue gas mass flow is relaxed while outputting power. The waste gas 25 flowing out of the turbine still has a high turbine outlet temperature $T_4$ of, for example, 500° C. and higher. This waste heat potential is preferably used in a manner known per se, for example, for generating steam in a waste heat generator. The power generated during the relaxation of the flue gas is used for driving the compressor 12 and generator 13. The generator generates an effective power $P_{ACT}$. A corresponding measuring signal is fed to a regulator 31, and is compared there with the set power $P_{SET}$. Based on the regulating deviation of the power, $P_{SET}$-$P_{ACT}$, a total fuel quantity adjustment value $Y_{FUEL}$ is calculated. Another regulator 35 records various temperature measuring values. The temperatures recorded there are regulated to set values or limited to maximum values by controlling the position of the adjustable pre-guide row 121 via a adjustment value $Y_{VIGV}$. The combustion chamber comprises a preburner 1 that preferably, for reasons of operational stability, is constructed as a diffusion burner. Part of the combustion air stream is passed over the preburner. This is followed by a mixing section 14 which in this case is constructed as a vortex generator of the type of vortex generator of the burner known from EP 321 809. The mixing section hereby consists of at least two circumferential segments of a cylindrical and/or truncated-cone-shaped hollow body, which are arranged with their longitudinal axes essentially parallel to the flow direction of the combustion chamber, whereby the longitudinal axes of the individual circumferential segments are offset relative to each other transversely to the flow direction, forming tangentially-radially oriented inflow openings. A burner of the preburner stage is in fluid connection with an upstream frontal side of the mixing device, the catalytic burner stage is in fluid connection with a downstream frontal side, and the inflow openings are in fluid connection with an inflow area of the combustion chamber in such a way that during operation of the gas turbo group, a first gas mass flow coming from the preburner stage essentially flows axially through the mixing device, and a combustion air mass flow with a tangential stream component flows into the mixing device. In this way, the first air stream 26 passed over the preburner 1 is mixed with the vortexed additional combustion air. A catalytic burner stage 2 follows downstream from the mixing segment. The catalytic stage is followed by a non-catalytic, second burner stage constructed as a self-igniting combustion chamber of the type known from EP 669 500. Fluid flowing from the catalytic stage flows at a high speed into a flow channel in which vortex generators 11, especially of the type known from CH 688868, and a fuel lance 5 are arranged. The channel merges with an abrupt increase in cross-section into a combustion chamber 6, from which the fluid 24 finally flows to the turbine 4. To ensure function of the catalytic combustion chamber, the temperature $T_1$ at its entrance must reach a certain minimum value, for example, of 450° C. During operation of a modern gas turbine, such a temperature is often present at the compressor outlet in load operation in any case, if the compressor works without cooling. The flow around the combustion chamber also works to heat the combustion air before it flows into the combustion chamber. However, a reliable operation requires that the minimum temperature is maintained under all circumstances upstream from the catalyzer. A partial stream $\dot{m}_P$ of the total fuel mass flow $\dot{m}_{FUEL}$ is therefore metered into the preburner 1 via a regulating element 16. The regulating element 16 is adjusted in relation to a control value $Y_P$. The temperature $T_1$ at the inlet into the catalytic stage is measured and fed to a regulator 32. The regulator 32 compares the actual temperature value $T_1$ with the minimum value $T_{MIN}$ and calculates the adjustment value $Y_P$ from it. This ensures that a minimum required inlet temperature always is present at the inlet of the catalytic combustion chamber. The regulation of the fuel mass flow to the preburner is preferably accomplished so that even with an inlet temperature of the combustion air that per se already exceeds the required minimum value, a minimum fuel quantity is always added in such a way that the preburner 1 is operated during the entire operation of the gas turbo group, even if this is not necessarily required. Such an operation indeed increases the nitrogen oxide emissions of the gas turbo group. However, this disadvantage is compensated by operational advantages. If the gas turbo group is operated, for example, at full load, the operation of the preburner 1 is typically not necessary. During a rapid load shedding or even load rejection, the temperature of the inflowing combustion air 23 very quickly drops below the minimum value, and the operation of the preburner 1 becomes absolutely necessary again. It is hereby advantageous if only its thermal power must be increased rather than having to reignite the flame of the preburner in an operating state that is transient in any case. The hot gas 26 generated by the preburner 1 is mixed in the mixing section 14 with the other combustion air. Another part $\dot{m}_C$ of the fuel mass flow is mixed with the combustion air heated in this manner upstream from the catalytic combustion chamber 2. On the one hand, this mixing must take place in such a way that the most homogeneous fuel-air mixture possible is present on entering the catalyzer, and on the other hand in such a way that no ignition and flame stabilization of the fuel in the hot gas occurs. Naturally, the quantity of fuel converted in the catalyzer is not unlimited, since its maximum permissible temperature is limited. A regulating element 17 controlled with the adjustment value $Y_c$ from the regulator 33 is used to measure the fuel quantity $\dot{m}_C$ into the catalyzer. The regulator 33 receives as an input value a temperature $T_2$, obtained in a suitable manner, at the outlet of the catalyzer. The fuel quantity $\dot{m}_C$ of the catalyzer hereby can be regulated so that the temperature $T_2$ reliably does not exceed a permissible maximum value $T_{MAX}$ of, for example, 1000° C., which is tolerated by the catalyzer in permanent operation. This temperature necessarily must be higher than the minimum temperature required for the operation of the self igniting combustion chamber 6. This operation is low in noxious substances, since a maximum possible fuel quantity is catalytically converted. A set total fuel quantity required by the adjustment value $Y_{FUEL}$, which exceeds the mass flow convertible overall by the preburner and catalyzer, is recorded by the regulator 34, which calculates the $Y_{SEV}$ from it. This again affects the regulating element 18 and therefore controls the fuel mass flow $\dot{m}_{SEV}$ that is supplied to the self igniting combustion chamber 6 via the fuel lance 5. It is critical in this example to keep the regulating element 18 completely closed as long as the minimum temperature required for operation of a self igniting combustion chamber has not yet been achieved. With the catalyzers used today, the two temperatures in practice are however relatively close so that a safe operation of both the catalytic burner stage 2 and the self igniting combustion chamber 6 is only possible within a relatively small temperature range for $T_2$. It is therefore advantageous to establish a set value for $T_2$ that is on the one hand one safety margin higher than the minimum inlet temperature of the self-igniting combustion chamber 6, and on the other hand is one safety margin lower than the permanently permissible temperature of the catalytic stage 2. Based on the aforementioned temperatures, a temperature range of, for example, 950° C. to 980° C. would therefore be advantageous here; depending on the catalyst material used and the fuel, other temperature ranges may be advantageous also. Given the interaction of regulators 31, 33, and 34, the operation therefore takes place in such a way that at a temperature $T_2$ below a threshold value, initially only the catalytic burner stage is supplied with fuel. Once the temperature threshold value is reached, regulator 33 regulates via adjustment value $Y_C$ the fuel mass flow $\dot{m}_C$ to the catalytic stage in such a way that the temperature $T_2$ remains at a set value, and an excess part of the total fuel mass flow is recorded by the regulator 34 which controls, via the adjustment value $Y_{SEV}$, the regulating element 18 and feeds the fuel that can be converted neither in the preburner nor in the catalytic stage to the non-catalytic burner stage. The outlet temperature from the catalytic burner stage still can be analyzed in the pre-guide row regulator 35 also and can be used for regulating interventions for the position of the adjustable pre-guide row 121. In the process, two principally different operating modes of the pre-guide row regulation can be differentiated, i.e., an operating mode that is optimized with respect to degree of efficiency and an operating mode that is optimized according to the invention with respect to noxious substances. The operating mode optimized with respect to degree of efficiency is well known per se from the state of the art and works as follows: the pre-guide row regulator 35 records the temperatures $T_3$ before and $T_4$ after the turbine in a suitable manner. The adjustable pre-guide row is kept closed in the lower partial load range. In this manner, the temperature $T_4$ after the turbine very quickly rises along with increasing power of the gas turbine, so that even with a relatively low power a temperature is reached that makes it possible to generate high quality live steam with a specific pressure and a specific superheating in a following waste heat steam generator, which live steam, for example, permits operation of a steam turbine. When a set value of the turbine outlet temperature $T_4$ is reached, the pre-guide row is opened, and the temperature is maintained constant. At the same time, the turbine inlet temperature $T_3$ is monitored. When this temperature reaches a permissible maximum value, the turbine inlet temperature $T_3$ replaces the turbine outlet temperature $T_4$ as a guide value of regulation and is maintained constant at maximum turbine inlet temperature and completely opened pre-guide row until the full load is reached. In order to further increase power without increasing the process temperatures, methods for cooling the suction air and/or for cooling the air in the compressor (36, in FIG. 1) which are known per se can be used in parallel, alternatively, or preferably in a cascading manner. When injecting fluid droplets upstream from the compressor (37, in FIG. 1), as is known from FR 1 563 749, the effects supplement each other, since on the one hand water evaporating upstream from the compressor causes a cooling of the suction air and thus an increase of the combustion air mass flow, and since on the other hand the evaporation of droplets in the compressor reduces the power consumption of the compressor. This operation ensures optimum efficiency, especially during combination operation, since it ensures advantageous live steam data of a steam turbine fed from a following waste heat steam generator over a broad operating range of the gas turbo group. In emissions-optimized operation according to the invention, the catalyzer outlet temperature $T_2$ is used as a guide value for the pre-guide row adjustment in the partial load range: as soon as this value reaches the set value, the pre-guide row is opened. The resulting increase in the combustion air mass flow permits an increase in the fuel mass flow $\dot{m}_C$ the catalytic stage without exceeding a permissible maximum outlet temperature $T_{MAX}$. This enables a low-emissions conversion of a maximum fuel mass flow in the catalytic stage. The temperature $T_3$ before the turbine 4 hereby continually remains relatively low at the value $T_2$, since no more firing occurs downstream from the catalytic stage. In order to further increase power without increasing the process temperatures, methods for cooling the suction air and/or for cooling the air in the compressor which are known per se can be used in parallel, alternatively, or preferably in a cascading manner. When injecting fluid droplets upstream from the compressor, as is known from FR 1 563 749, the effects supplement each other, since on the one hand water evaporating upstream from the compressor causes a cooling of the suction air and thus an increase of the combustion air mass flow, and since on the other hand the evaporation of droplets in the compressor reduces the power consumption of the compressor. Only when the pre-guide row 121 is completely opened and/or if other measures for increasing the combustion air mass flow, such as, for example, the cooling of the suction air and, in particular, the injection of fluid droplets upstream from the compressor and/or into the compressor, have been fully utilized, the fuel mass flow of the catalytic stage can no longer be further increased, and the following, non-catalytic burner stage is taken into operation for an additional power increase until the turbine inlet temperature $T_3$ reaches its permissible maximum value and the maximum power of the gas turbo group is therefore reached. This operation is characterized in that essentially the entire fuel mass flow is converted almost emissions-free in the catalytic burner stage over a broad operating range, and an operation with less noxious substances than in the efficiency-optimized operating mode is ensured even up to the full load operating point. In contrast, the temperature $T_4$ after the turbine remains low over a broad operating range, i.e., too low to generate live steam in a waste heat steam generator following the turbine for efficient operation of a steam turbine in combination operation. As already explained above, a gas turbo group operated according to the concept according to the invention is therefore suitable for optimizing waste heat use, in particular in combination with the power plant system described in WO 03/076781. Because the catalyzer outlet temperature need not be used for power regulation in the upper power range in any operating mode and, independently from the machine operating point, there exists the advantageous possibility to always operate the catalyzer somewhat below the permissible maximum temperature, there is no risk of flashback, and the catalyzer can be constructed somewhat longer than would be actually necessary. This results in better controlled combustion and better operating behavior beyond the design point. There is also greater freedom in selecting the catalyst material, which, among other things, may result in a substantial cost advantage, and the band width of convertible fuels becomes broader without having to tolerate an increased flashback risk.

Figure 2:
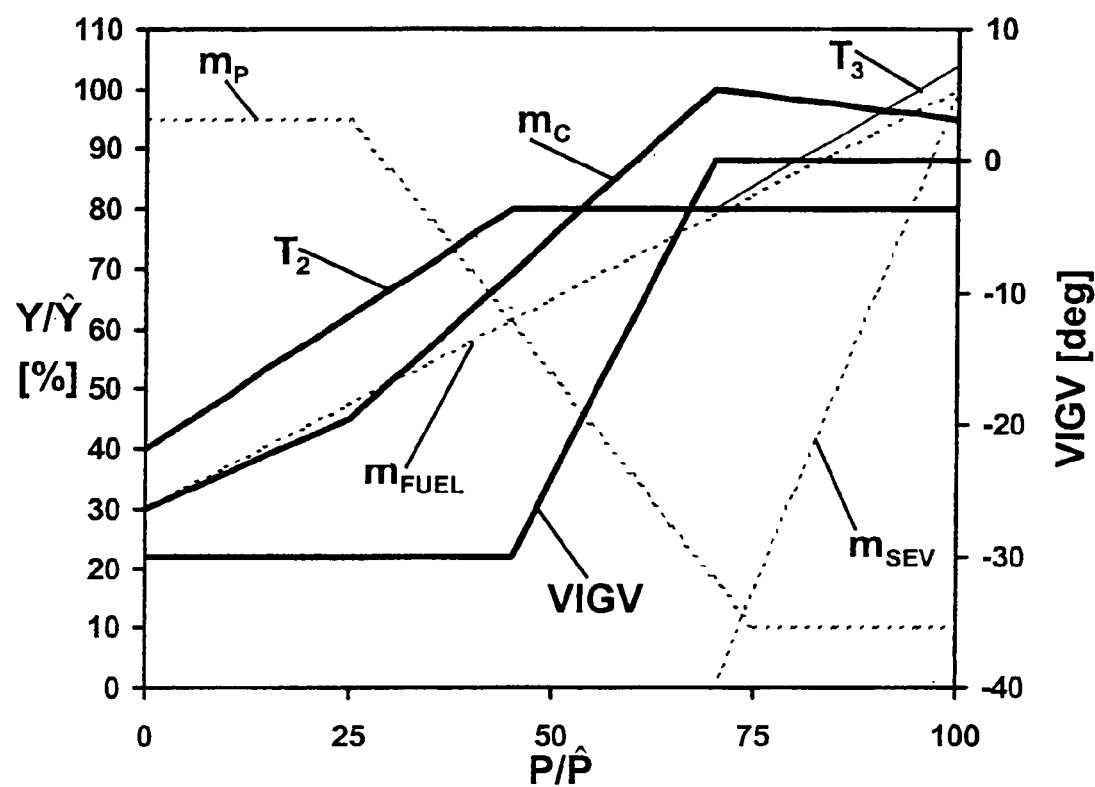
FIG. 2 shows an example of a progression of the fuel quantities supplied to the different burner stages in relation to the relative power of the gas turbo group; and, FIG. 3 shows an example of a progression of various machine parameters for a load rejection.

FIG. 2 is a qualitative illustration of an example of the fuel mass flows progression in the various burner stages of the combustion chamber shown in FIG. 1 in relation to the relative power $P/\hat{P}$, with full load power $\hat{P}$. This is a schematic illustration that does not show all possible details of the fuel mass flow progressions, but which focuses on the details necessary to understand the invention. The values entered towards the top are in each case shown in relation to a reference value $\hat{Y}$. They are also not values for a specific machine, but for the operation of a fictional, yet representative gas turbo group. During idling, at a nominal speed without net power output, the catalytic burner stage is already in operation in this embodiment. The catalytic burner stage preferably is already taken into operation during acceleration of the gas turbo group to nominal speed, for example at 70 to 80% of the nominal speed. This makes it possible that the catalytic burner stage can remain operational during the entire nominal operation of the gas turbo group, including in under-speed operation, and switching transients that are able to negatively influence both combustion stability as well as mechanical integrity of the catalyzer are avoided. The fuel mass flow of the catalytic stage is shown in the drawing in FIG. 2 as $\dot{m}_C$. According to the example, the catalytic burner stage is supplied during idling with approximately 30% of a maximum fuel mass flow. The fuel mass flow to the preburner stage is represented by the line labeled with $\dot{m}_P$. In a load range up to approximately 25% of relative power, the preburner stage receives almost the maximum possible fuel mass flow. This ensures that the temperature at the inlet into the catalytic burner stage is always higher than the minimum temperature necessary for operation. At a power increase from idling, the total fuel mass flow $\dot{m}_{FUEL}$ increases, whereby the entire mass flow increase is fed to the catalytic burner stage. This causes the temperature $T_2$ at the outlet from the catalytic stage to rise. With an increasing compressor pressure ratio, the compressor end temperature also rises. Starting at approximately 25% of relative power, the fuel mass flow of the preburner stage therefore can be reduced. This mass flow differential is also fed to the catalytic stage, causing the gradient of $\dot{m}_C$ to rise. In the process, $T_2$ continues to rise. The pre-guide row, whose position is illustrated by the line labeled VIGV, is hereby in the maximum closed position of, for example, −30°. As has already been explained repeatedly, the catalyzer outlet temperature $T_2$ has an upper limited determined by the permissible material temperature of the catalytic stage. It was assumed, as an example, that the maximum permissible temperature is 80% of the maximum process temperature. When $T_2$ reaches this value, the pre-guide row is opened according to the invention in order to limit the temperature at the outlet from the catalytic stage. The entire fuel mass flow is hereby also fed to the preburner and catalytic stage. The pre-guide row is further opened with an additional increase of the total fuel mass flow $\dot{m}_{FUEL}$, which increases the fuel mass flow, causing the temperature $T_2$ to be regulated to a constant set value. Since no further heat addition occurs downstream from the catalytic burner stage, the turbine inlet temperature $T_3$ equals temperature $T_2$. At approximately 70% relative power, the pre-guide row is completely open. With another power increase, the temperature at the catalyzer outlet is regulated by metering the fuel mass flow into the catalytic burner stage. An excess part $\dot{m}_{SEV}$ of the total fuel mass flow is allocated to the following non-catalytic combustion chamber. The turbine inlet temperature $T_3$ therefore exceeds the outlet temperature $T_2$ of the catalytic burner stage. With a further increasing pressure ratio and firing power, the inlet temperature of the combustion air into the combustion chamber rises. The fuel mass flow $\dot{m}_P$ to the preburner stage is therefore reduced further. From a certain point on, the firing of the preburner stage becomes no longer necessary, since the inlet temperature of the combustion air is already sufficient to ensure a stable reaction in the catalytic burner stage. Yet the preburner stage is not completely taken out of operation but is supplied until a full load is reached with a fuel mass flow, for example 10%, necessary for maintaining a stable pilot flame. This has operational advantages, i.e., to be able to quickly increase the firing power of the preburner stage for quick negative power gradients, as they occur during protective or rapid load shedding and even more so during load rejection, instead of first having to ignite the preburner stage. Because of the rising temperature at the inlet into the catalytic stage and the limited outlet temperature $T_2$, the thermal power convertible in the catalytic stage decreases, and as a result the fuel mass flow $\dot{m}_C$ also drops somewhat again.

Figure 3:
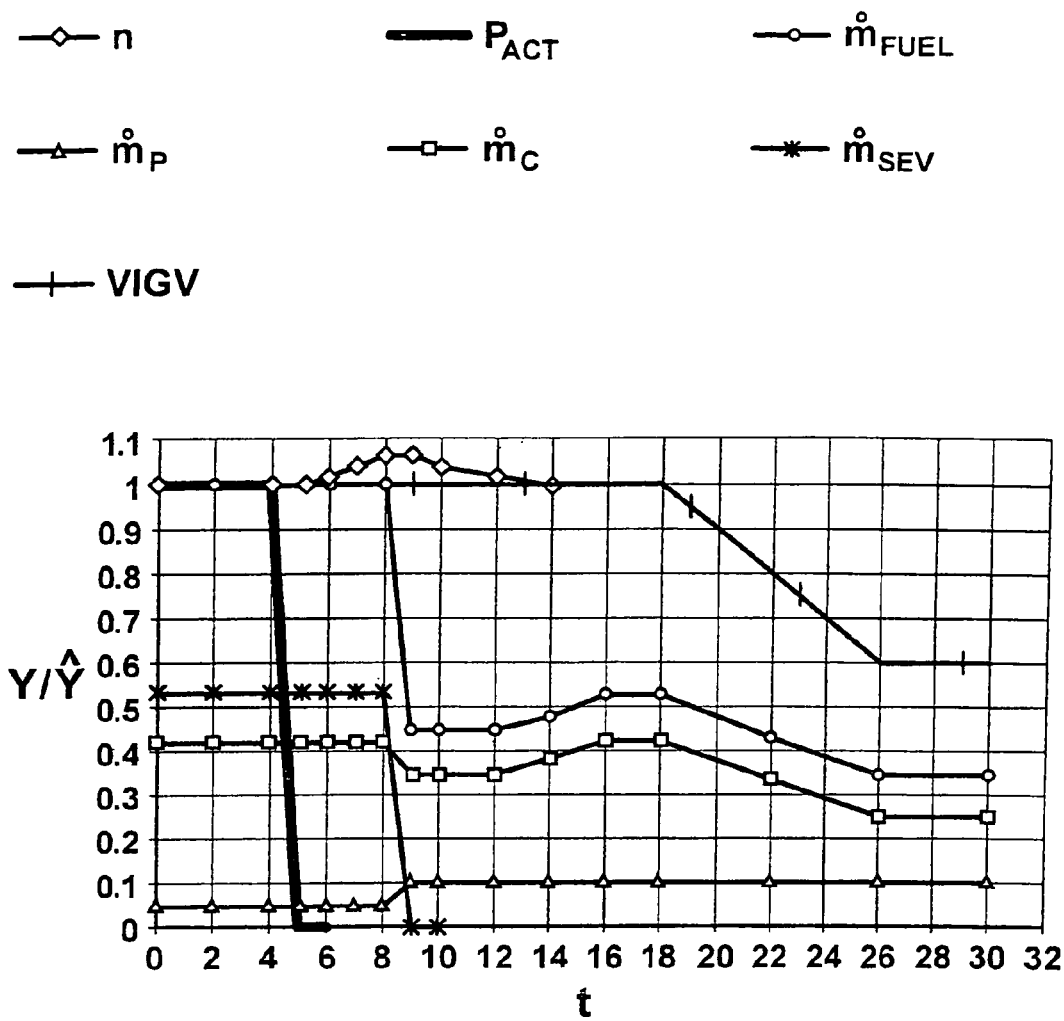

Such a quick drop in power occurs with a load rejection. FIG. 3 shows a qualitative illustration of these processes. The order of magnitude of the values that have been entered upwards cannot be compared quantitatively with the values shown in FIG. 2. Load rejection occurs at t=5 seconds. Within a very quick time, speed n changes to an over-speed that must be limited by reducing the thermal power in order to avoid a critical over-speed. During this process, the gas turbo group should remain in operation. The non-catalytic, second burner stage is immediately shut off. At the same time, the preburner 1 is supplied with an increased, precontrolled fuel quantity, so that the catalytic burner stage 2 is not extinguished. The fuel mass flow $\dot{m}_C$ to the catalytic burner stage 2 then is regulated so that the nominal speed is reached and is not significantly fallen short of. During the entire process of the limiting and regulating of the machine speed, the pre-guide row VIGV remains fully open so that no other variable parameters are introduced into the machine regulation; only after a stable regulation of the machine speed to nominal speed, the pre-guide row is slowly closed.

LIST OF REFERENCE NUMERALS 1 preburner, preburner stage
2 catalytic burner stage
3 low pressure combustion chamber, self-igniting combustion chamber, non-catalytic burner stage
4 turbine
5 fuel lance
6 combustion chamber of self-igniting combustion chamber
11 vortex generator
12 compressor
13 generator
14 mixing section
15 shaft
16 regulating element
17 regulating element
18 regulating element
21 ambient air
22 condensed air
23 combustion air
24 compressed flue gas
25 relaxed flue gas, waste gas
26 air stream of preburner
31 regulator
32 regulator
33 regulator
35 regulator
121 adjustable pre-guide row
$\dot{m}_{FUEL}$ total fuel mass flow
$\dot{m}_C$ fuel mass flow to catalytic burner stage
$\dot{m}_P$ fuel mass flow to preburner
$\dot{m}_{SEV}$ fuel mass flow to non-catalytic combustion chamber
n rotor speed
$\hat{n}$ nominal rotor speed
$P_{ACT}$ actual effective power
$P_{SET}$ set effective power
P/P relative power
$T_1$ temperature at inlet into catalytic combustion chamber
$T_2$ temperature at outlet of catalytic combustion chamber
$T_3$ temperature before turbine $T_4$ temperature after turbine; waste gas temperature
$T_{MIN}$ minimum required temperature at inlet into catalytic combustion chamber
$T_{MAX}$ maximum permissible temperature at outlet of catalytic combustion chamber
VIGV position of adjustable pre-guide row
$Y/\hat{Y}$ relative value
$Y_{FUEL}$ adjustment value for fuel mass flow
$Y_C$ adjustment value for fuel mass flow to catalytic burner stage
$Y_P$ adjustment value for fuel mass flow to preburner stage
$Y_{SEV}$ adjustment value for fuel mass flow to non-catalytic combustion chamber.
$Y_{VIGV}$ pre-guide row adjustment value

We claim:

1. A method for operating a gas turbo group, which gas turbo group includes at least one combustion chamber, wherein the combustion chamber includes at least one catalytic, first burner stage and a second, non-catalytic burner stage following the at least one catalytic burner stage in the flow direction, the method comprising:
supplying the gas turbo group with a total fuel mass stream ($\dot{m}_{FUEL}$) of the gas turbo group;
distributing the total fuel mass stream to at least the catalytic burner stage and the non-catalytic burner stage;
determining the temperature ($T_2$) at the outlet from the catalytic burner stage;
regulating, limiting to a set value, limiting to a maximum value, or combinations thereof, the temperature at the outlet from the catalytic burner stage by changing the combustion air mass stream and blocking the fuel supply to the non-catalytic burner stage when the combustion air mass stream is below an achievable maximum;
determining a net power output ($P_{ACT}$) of the gas turbo group; and
regulating the fuel mass flow ($m_{SEV}$) to the non-catalytic burner stage depending on a control deviation ($P_{SET}$-$P_{ACT}$) of the net power output.

2. A method according to claim 1, wherein changing the combustion air mass stream comprises adjusting an adjustable guide row of a compressor of the gas turbo group.

3. A method according to claim 2, comprising:
keeping the adjustable compressor guide row closed when the temperature at the outlet from the catalytic burner stage is below a set value.

4. A method according to claim 1, comprising:
cooling suction air upstream from the compressor in order to increase the combustion air mass stream.

5. A method according to claim 4, further comprising:
injecting fluid droplets into the suction air for cooling.

6. A method according to claim 1, further comprising:
operating a non-catalytic preburner stage upstream from the catalytic burner stage.

7. A method according to claim 6, further comprising:
determining the temperature ($T_1$) at the inlet into the catalytic stage; and
regulating compliance with a minimum value of the temperature at the inlet into the catalytic stage by adjusting the fuel mass stream $\dot{m}_p$ to the preburner stage.

8. A method according to claim 6, comprising:
operating the preburner stage in a diffusion combustion mode.

9. A method according to claim 1, further comprising:
in the presence of a maximum combustion air mass stream, supplying a fuel mass stream ($\dot{m}_{SEV}$) additionally necessary for regulating the net power output to a combustion chamber or burner stage located downstream from the catalytic burner stage.

10. A method according to claim 1, further comprising:
operating the second non-catalytic burner stage as a self-igniting combustion chamber.

11. A method according to claim 1, wherein the regulating value of the temperature at the outlet from the catalytic stage corresponds essentially to the maximum permissible temperature of the catalyst material.

12. A method according to claim 1, wherein the regulating value of the temperature at the outlet from the catalytic stage is higher than the temperature necessary for a spontaneous self-ignition of the fuel in the second non-catalytic burner stage.

13. A method according to claim 9, wherein the presence of a maximum combustion air mass stream comprises a fully opened adjustable guide row.

14. A method according to claim 9, wherein a combustion chamber or burner stage comprises the non-catalytic burner stage.

* * * * *